United States Patent
Joo et al.

(10) Patent No.: US 7,412,169 B2
(45) Date of Patent: Aug. 12, 2008

(54) FTTH SYSTEM FOR CONVERGENCE OF BROADCASTING AND COMMUNICATION THROUGH SWITCHED BROADCASTING

(75) Inventors: Young-Hun Joo, Suwon-si (KR); Jun-Ho Koh, Suwon-si (KR); Chan-Yul Kim, Buchcon-si (KR); Jae-Hun Cho, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 709 days.

(21) Appl. No.: 10/825,819
(22) Filed: Apr. 16, 2004
(65) Prior Publication Data

US 2005/0053376 A1    Mar. 10, 2005

(30) Foreign Application Priority Data

Sep. 8, 2003  (KR) .................. 10-2003-0062856

(51) Int. Cl.
   *H04J 14/00*   (2006.01)
(52) U.S. Cl. ............................. 398/72; 398/66; 398/67; 398/68; 398/69; 398/70; 398/71; 398/59; 398/75; 398/76; 398/79; 398/98; 398/99; 398/100; 398/45; 398/48; 370/468; 370/466; 370/390; 370/395.3; 370/395.53; 370/352; 370/389; 370/399; 370/432; 370/420; 725/121; 725/127; 725/129; 725/109; 725/110
(58) Field of Classification Search ............... 398/72, 398/70, 71, 76, 79, 91, 98, 100, 66, 67, 68, 398/45, 46, 47, 48, 50, 52, 53, 69, 75, 99, 398/168, 59; 370/468, 401, 466, 352, 389, 370/432, 252, 535, 395.2, 395.3, 395.4, 395.43, 370/390, 395.53, 442, 420, 399; 725/121, 725/127, 129, 109, 110, 111
See application file for complete search history.

(56) References Cited

U.S. PATENT DOCUMENTS

| | | | |
|---|---|---|---|
| 6,751,417 B1* | 6/2004 | Combs et al. | 398/71 |
| 6,931,013 B2* | 8/2005 | Saikusa | 370/395.4 |
| 2006/0067691 A1* | 3/2006 | Hirano et al. | 398/71 |

FOREIGN PATENT DOCUMENTS

JP       05-206985       8/1993

OTHER PUBLICATIONS

T. Shiozaki et al.; "The Examination of the Function Extension by a WDM in a ATM-PON;" Proceeding of the 2001 IEICE General Conference; Mar. 26-29, 2001.

* cited by examiner

*Primary Examiner*—Hanh Phan
(74) *Attorney, Agent, or Firm*—Cha & Reiter, LLC (57) ABSTRACT

A fiber to the home FTTH network for convergence of broadcasting and communication is disclosed. The network includes: an OLT for receiving and converting a first predetermined number of broadcast signals and an Ethernet signal into a plurality of converted optical signals, combining the converted optical signals into converged optical signals for subsequent transmission by an optical wavelength division multiplexing method; and an optical network unit (ONU) for classifying the optical signal transmitted from the OLT into the first predetermined number of broadcast signals and the Ethernet signal, switching a second predetermined number of broadcasting signals of the first predetermined number of broadcasting signals according to each SIU by channel selection information contained in upstream Ethernet information, and switching the Ethernet signal to be transmitted to the SIU according to each SIU so as to transmit the switched signal.

18 Claims, 5 Drawing Sheets

FTTH SYSTEM FOR CONVERGENCE OF BROADCASTING AND COMMUNICATION THROUGH SWITCHED BROADCASTING

CLAIM OF PRIORITY

This application claims priority to an application entitled "FTTH system for convergence of broadcasting and communication through switched broadcasting" filed in the Korean Intellectual Property Office on Sep. 8, 2003 and assigned Serial No. 2003-62856, the contents of which are hereby incorporated by reference.

BACKGROUND OF THE INVENTION

1. Field of the Invention

The present invention relates to a Fiber-To-The-Home (FTTH) network for convergence of broadcasting and communication.

2. Description of the Related Art

In the prior art, in order to provide for the efficient exchange of an Ethernet signal which is a communication signal, a passive optical network (hereinafter, referred to as a PON) structure. In such a network, there is generally one optical line terminal (hereinafter, referred to as an OLT) that is located at a telephone office. The OLT is subsequently connected to an N number of optical network terminals (hereinafter, referred to as ONTs) that have been installed at homes.

In this PON structure, the efficiency of the network increases so much that Ethernet switches in the N number of ONTs share an Ethernet signal from an Ethernet switch in one OLT through a power splitter. In this type of structure, since continuous digital broadcasting signals must be transmitted to all subscribers in a single direction, there has been used a certain method of overlaying optical signals for digital broadcasting onto an Ethernet communication network.

Figure 1:
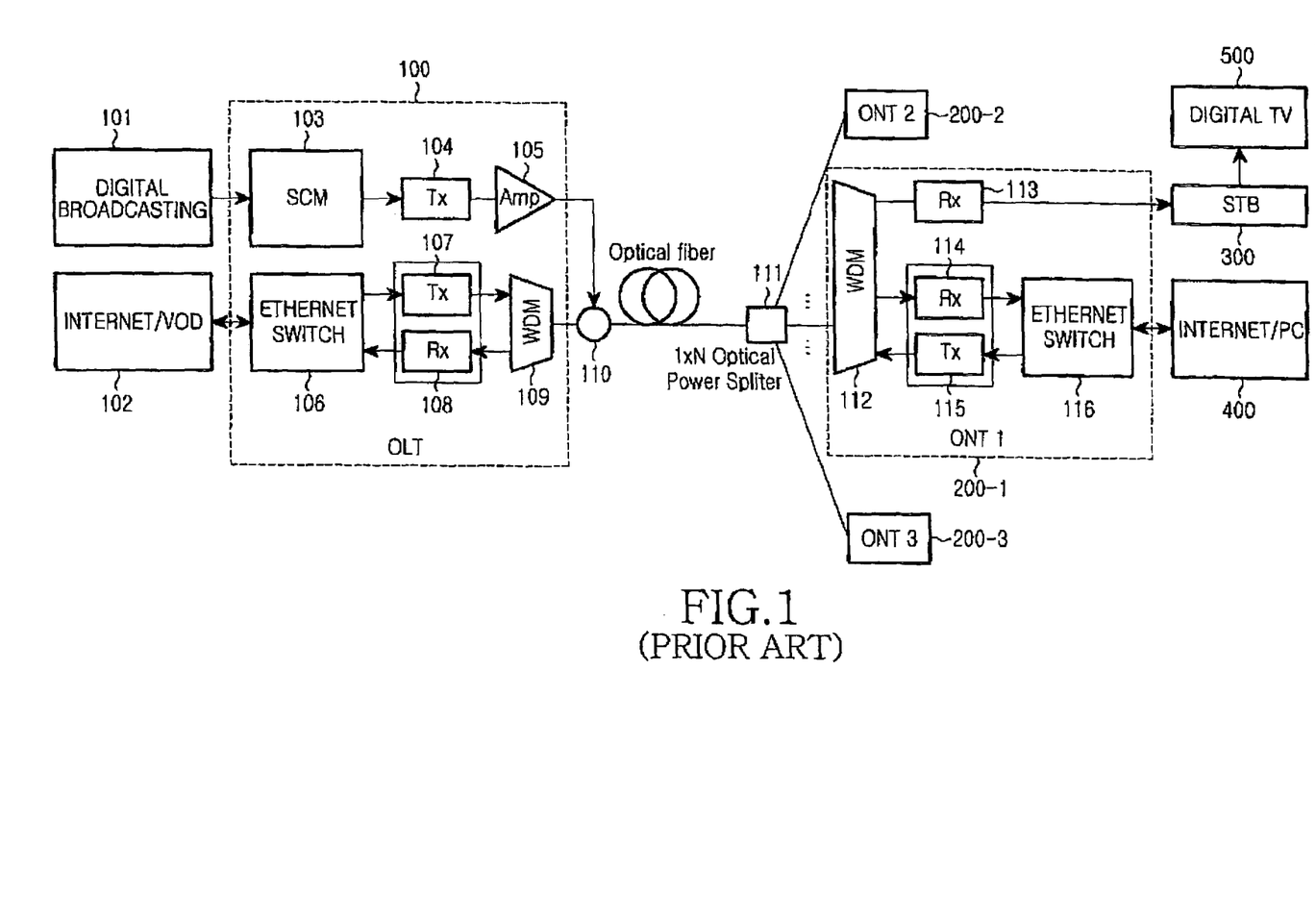
FIG. 1 is a block diagram of a conventional FTTH network.

FIG. 1 shows a construction for the conventional FTTH network as described above. As shown, an OLT 100 and a plurality of ONTs 200-1 to 200-3 are connected to each other by a 1×N optical power splitter 111 so as to form the FTTH network.

In a conventional network structure such as shown in FIG. 1, in order to service digital broadcasting and an Ethernet signal such as an Internet signal/video on demand (VOD) signal simultaneously, the OLT 100 includes an Ethernet switch 106, an optical transmitter 107, an optical receiver 108, and a wavelength division multiplexer 109 and processes the Ethernet signal through these devices. The Ethernet switch 106 switches downstream Ethernet information to each ONT and upstream Ethernet information from each ONT. The optical transmitter 107 generates a downstream optical signal for transmitting the downstream Ethernet information to the ONT. The optical receiver 108 converts an upstream optical signal into an electrical signal so as to transmit the converted signal to the Ethernet switch 106 for further communication with the Intent, or a Video on Demand. The wavelength division multiplexer 109 wavelength division multiplexes the downstream optical signal to transmit the multiplexed signal and receives the upstream optical signal. Also, the OLT 100 includes a Sub Carrier Multiplexing (hereinafter, referred to as an SCM) section 103, an optical transmitter 104, an optical amplifier 105 for amplifying an optical signal, and an optical coupler 110 for coupling with an Ethernet signal. The SCM section 103 modulates several digital broadcast channels of a digital broadcasting unit 101, respectively, from an exterior by a quadrature amplitude modulation (QAM) method, and also multiplexes the modulated channels by an SCM method.

The optical transmitter 104 optically modulates the multiplexed broadcast signal.

Furthermore, the optical signal transmitted from the optical coupler 110 is classified into an N number of powers by the 1×N optical power splitter 111 and the classified signals are distributed to each ONT.

Then, the optical signal that is distributed to the ONT from the optical power splitter is classified into a broadcasting signal and an Ethernet signal via a wavelength division multiplexing demultiplexer 112 for wavelength division multiplexing, which divides signals by wavelength. Further, the broadcasting signal and the Ethernet signal are processed by respective optical receivers 113 and 114. Herein, the broadcasting signal is transmitted to a set-top box (hereinafter, referred to as an STB) 300 and is passed through an RF filter in the STB 300. Then, only a desired RF signal is selected and decoded as a high definition television (HDTV) signal to enter a digital TV 500.

Also, the Ethernet signal is transmitted to an Internet/PC 400 through an Ethernet switch 116 which is then provided to a user. An upstream Ethernet signal sent from the user travels through the Ethernet switch 116 and is converted to an optically modulated signal via an optical transmitter 115. The modulated signal is transmitted to the OLT 100 through the wavelength division multiplexing demultiplexer 112.

The PON structure used for overlaying the conventional digital broadcasting and providing network service as described above has the following problems.

Firstly, the PON structure, in which one OLT transmits a signal to the N number of ONTs by means of the power splitting method, has a limitation in the number of the ONTs that can be in communication with the one OLT. According the current technology, since 64 divisions at maximum can be performed in consideration of a power margin, a digital broadcasting signal can be transmitted to 64 ONTs at a maximum by means of one analog optical transmitter.

Accordingly, when the number of the ONTs exceeds 64, since another PON system is additionally required as the maximum of the first PON has been exceeded, then the overlay operation must be performed by means of another analog optical transmitter, increasing the costs of the entire system.

Further, when 64 divisions at maximum are performed, an expensive optical amplifier, such as an EDFA, must be used next to the optical transmitter in order to increase the intensity of an optical signal and secure a carrier to noise ratio (CNR) for maintaining broadcasting quality. Furthermore, even in a case of a network utilizing an optical transmitter and the optical receiver, an expensive optical transceiver having a good property is required, increasing these costs of the entire system increases.

Furthermore, in a case of the conventional overlay method, since the STB receives all broadcastings, the STB of each subscriber requires a subscriber authentication and a real time accounting by a conditional access system (hereinafter, referred to as a CAS) system supporting encryption and decryption. Furthermore, since all broadcasting signals are transmitted to each ONT, an optical line having a large bandwidth must be used.

SUMMARY OF THE INVENTION

Accordingly, the present invention has been made to solve the above-mentioned problems occurring in the prior art, and a first object of the present invention is to provide a new structure of a FTTH network which provides a service to a plurality of subscribers grouped in a unit of an ONU in a FTTH system, so as to permit the convergence of broadcasting and communications.

A second object of the present invention is to provide a FTTH network for the convergence of broadcasting and communications, in which an ONU performs switching for broadcasting and transmits only broadcasting information switched to each subscriber, so that a bandwidth can be efficiently used.

A third object of the present invention is to provide a FTTH network for convergence of broadcasting and communication, in which an ONU performs switching for broadcasting and transmits only broadcasting information switched to each subscriber, so that the ONU can perform a subscriber authentication and a real time accounting by a CAS system includes supporting encryption and decryption.

A fourth object of the present invention is to provide a FTTH network for convergence of broadcasting and communication which enables a low priced light source operating at a low speed to be used, without using an expensive light source for increasing a transmission speed, because digital broadcastings in all channels are not transmitted to each of the subscribers.

In order to accomplish the aforementioned aspects of the present invention, there is provided a FTTH system for the convergence of broadcasting and communications through a switched broadcasting comprising: an OLT for receiving a first predetermined number of broadcasting signals and an Ethernet signal, converting the received signals into optical signals, combining the converted optical signals into optical signals, and transmitting the combined optical signals by an optical wavelength division multiplexing method; an ONU for classifying the optical signal transmitted from the OLT into the first predetermined number of broadcasting signals and the Ethernet signal, converting the classified signals into electrical signals, switching a second predetermined number of broadcasting signals of the first predetermined number of broadcasting signals according to each SIU by means of channel selection information contained in upstream Ethernet information, and switching the Ethernet signal to be transmitted to the SIU according to each SIU so as to transmit the switched signal; and an SIU for converting the signals transmitted from the ONU into electrical signals, transmitting the second predetermined number of broadcasting signals and the Ethernet signal to be transmitted to the subscriber to a corresponding subscriber' terminal, and transmitting the upstream Ethernet information including the upstream Ethernet information for the broadcasting signal to the ONU.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, preferred aspects of the present invention will be described with reference to the accompanying drawings. The same reference numerals are used to designate the same elements as those shown in other drawings. In the following description of the present invention, a detailed description of known functions and configurations incorporated herein will be omitted when it may obscure the subject matter of the present invention.

Figure 2:
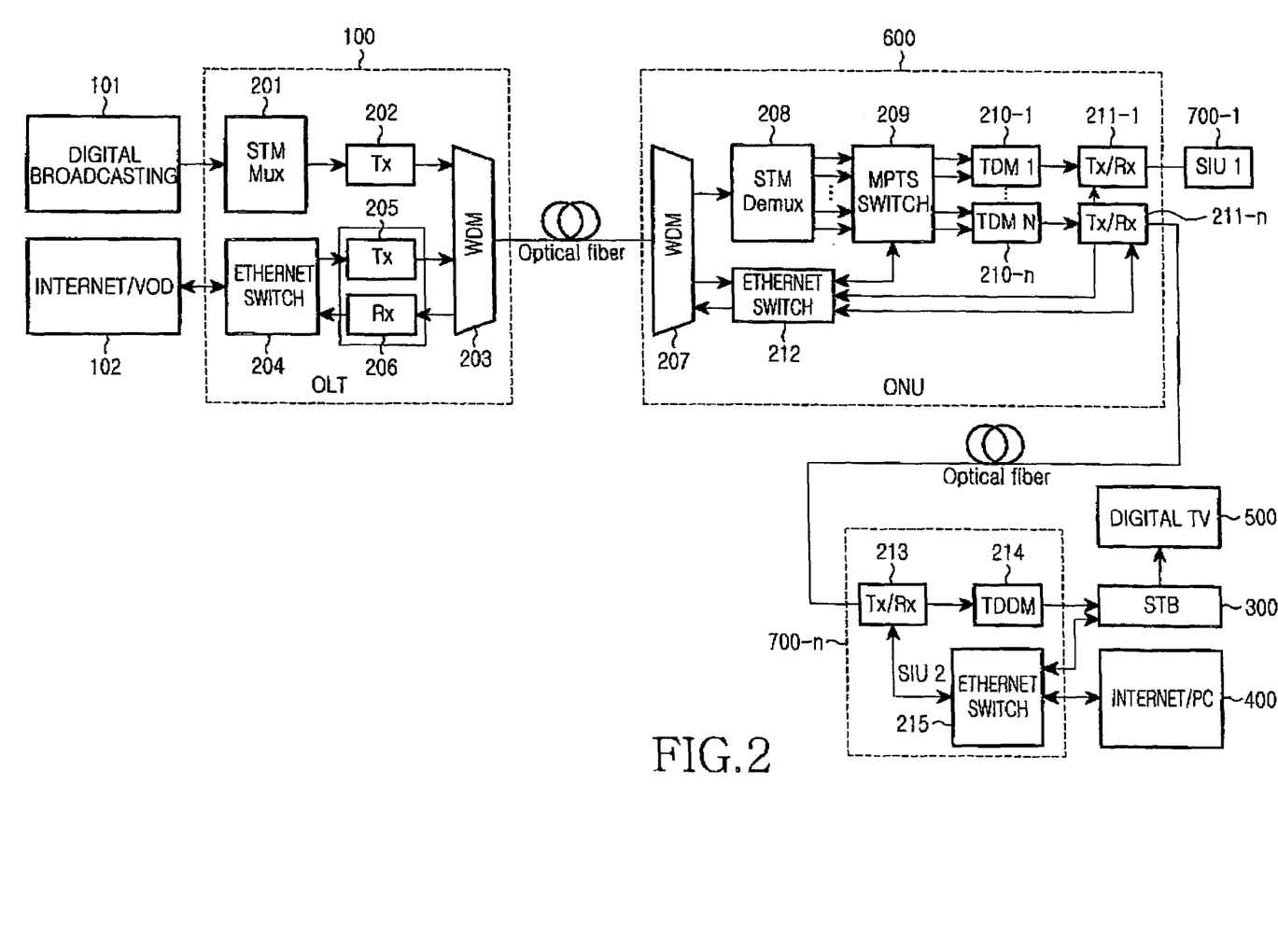
FIG. 2 is a block diagram showing an FTTH network for convergence of broadcasting and communication through a switched broadcasting according to a first aspect of the present invention.

FIG. 2 is a block diagram showing an FTTH network for convergence of broadcasting and communication through a switched broadcasting according to a first aspect of the present invention.

As shown in FIG. 2, an OLT 100 and an ONU 600 are connected to each other through one optical fiber, and a downstream output of the ONU 600 is connected to each subscriber interface unit (hereinafter, referred to as an SIU) 700-1 or 700-n through respective optical fibers, so that a true FTTH network is formed.

According to the present invention, this FTTH network structure, in order to service a digital broadcast signal 101 and an Ethernet signal, 102 such as an Internet signal/video on demand (VOD) signal simultaneously, the OLT 100 includes an Ethernet switch 204, an optical transmitter 205, an optical receiver 206, and processes the Ethernet signal through these devices. The Ethernet switch 204 switches a downstream Ethernet signal to be transmitted to each SIU 700-1 700-1n and an upstream Ethernet signal to be transmitted from each SIU. The optical transmitter 205 generates a downstream optical signal for transmitting the downstream Ethernet signal. The optical receiver 206 converts an upstream optical signal into an electrical signal so as to transmit the converted signal further upstream to the Ethernet switch 204. Furthermore, the OLT 100 includes a synchronous time multiplexing (hereinafter, referred to as an STM) section 201 and an optical transmitter 202, and the OLT processes a broadcast signal through these devices. The STM multiplexing section 201 respectively multiplexes several digital broadcasting channels by the STM method, and the optical transmitter 202 optically modulates the multiplexed broadcasting signal. Furthermore, the OLT 100 includes a wavelength division multiplexer 203 and combines both the broadcasting signal and the Ethernet signal to transmit the combined signal. The wavelength division multiplexer 203 wavelength division multiplexes the downstream optical signal including the broadcasting signal and the Ethernet signal to transmit the optical multiplexed signal, and receives the upstream Ethernet signal.

The ONU 600 includes a wavelength division multiplexing demultiplexer 207 for wavelength division demultiplexing, an STM demultiplexing section 208, an MPTS switch 209, an N number of time division multiplexers (hereinafter, referred to as TDMs) 210-1 to 210-n, an Ethernet switch 212, and an N number of transceivers 211-1 to 211-n. The wavelength division multiplexing demultiplexer 207 divides signals by wavelength, and the STM demultiplexing section 208 STM demultiplexes the wavelength division demultiplexed broadcasting signal to classify the demultiplexed signals into respective digital broadcasting signals. The multiple program transport stream (MPTS) switch 209 receives the digital broadcasting signals classified by the STM demultiplexing section 208 and switches a predetermined number of broadcasting signals to each SIU according to a control signal of the SIU. Each of the TDMs 210-1 to 210-$n$ time division multiplexes the predetermined number of switched broadcasting signals into one signal so as to transmit the multiplexed signals to each SIU. The Ethernet switch 212 switches the wavelength division demultiplexed downstream Ethernet signals to respective SIUs, transmit channel selection information contained in the upstream Ethernet signal from each SIU to the MPTS switch 209, and transmit other upstream Ethernet signals to the OLT 100. Each of the transceivers 211-1 to 211-$n$ transmit the broadcasting signal and the Ethernet signal switched according to each SIU, and receives an Ethernet signal including a broadcasting selection signal from each SIU.

Each of the SIUs 700-1 to 700-$n$ includes a transceiver 213, a time division demultiplexer (hereinafter, referred to as a TDDM) 214, and an Ethernet switch 215. The transceiver 213 receives the broadcasting signal and the Ethernet signal from the ONU 600, and transmits the upstream Ethernet signal having channel selection information and a communication signal generated by a subscriber. The TDDM 214 time division demultiplexes the broadcasting signal from the ONU 600 so as to classify the demultiplexed signals into respective broadcasting signals, and transmits the broadcasting signals to an STB 300 of the subscriber. The Ethernet switch 215 receives the channel selection information from the STB 300 of the subscriber and the Ethernet signal from an Internet/personal computer (hereinafter, referred to as a PC) 400, transmits the received channel selection information and the Ethernet signal to the ONU 600 through the transceiver 213, and transmit Ethernet information from the ONU 600, which has been sent through the transceiver 213, to the STB 300 of the subscriber or the Internet/PC 400.

Hereinafter, an operation in the FTTH network according to the present invention will be described, in comparison with the conventional FTTH network for convergence of broadcasting and communication employing an overlay method. In the prior art, all broadcasting signals are transmitted to respective ONTs. In contrast, in the present invention, all broadcasting signals are transmitted up to the ONU 600, the channel selection information is received from each SIU, and only a broadcasting signal of a channel selected through switching using the channel selection information is transmitted to the SIU.

Therefore, there exists an upstream signal for a broadcasting selection from the SIU, so that an interactive broadcasting service, which is a characteristic of a digital broadcasting, can be performed through the upstream signal. That is, since the channel selection information and information for the interactive broadcasting is simultaneously transmitted, the interactive broadcasting service can be performed.

As described above, since the ONU 600 performs the switching for the broadcasting, an authentication and accounting system such as a CAS may be mounted on the ONU 600 and the ONU 600 may perform the switching. Therefore, the ONU 600 may perform an authentication and accounting operation.

Figure 3:
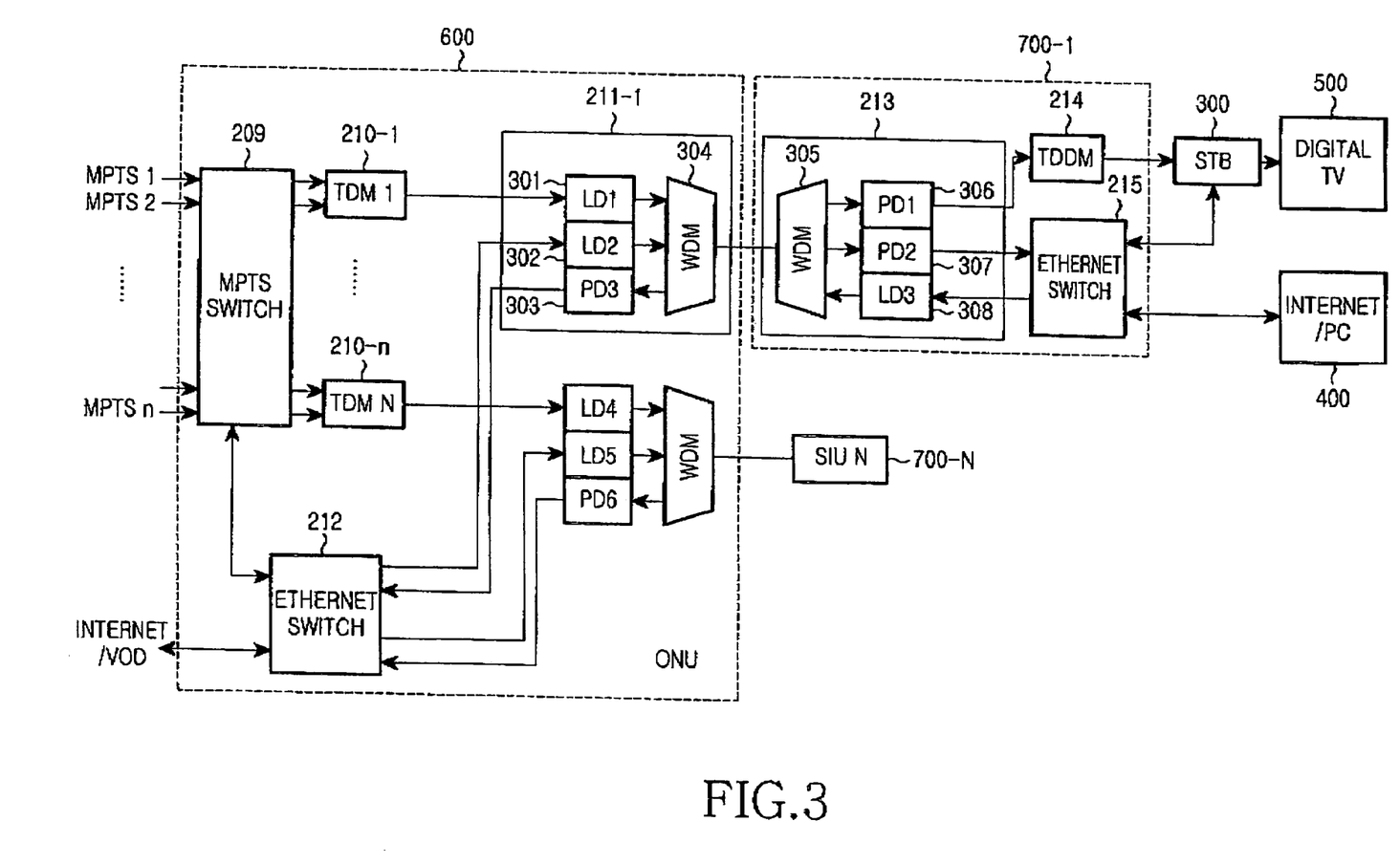
FIG. 3 is a block diagram showing one construction of an ONU and an SIU in the FTTH network for convergence of broadcasting and communication through the switched broadcasting according another aspect of the present invention.

FIG. 3 is a block diagram showing the ONU and the SIU in the FTTH network for convergence of broadcasting and communication through the switched broadcasting according to one embodiment of the present invention.

FIG. 3 is a block diagram showing a construction formed when triplex transceivers are respectively used in the ONU and the SIU in the FTTH network for convergence of broadcasting and communication through the switched broadcasting according to the present invention in FIG. 2.

As shown in FIG. 3, the ONU 600 includes the STM demultiplexing section (not shown), the multiple program transport stream (MPTS) switch 209, the TDMs 210-1 to 210-$n$, the Ethernet switch 212, and the N number of transceivers 211-1 to 211-$n$. The STM demultiplexing section divides broadcasting signals from the OLT 100, which are wavelength division multiplexed by the wavelength division multiplexing demultiplexer (not shown) for wavelength division demultiplexing and dividing signals by wavelength, into respective digital broadcast signals. The MPTS switch 209 switches a predetermined number of broadcast signals of the broadcast signals input according to the SIU by a control signal (i.e., channel selection information) from the Ethernet switch 212. Each of the TDMs 210-1 to 210-$n$ time division multiplexes the broadcast signals, which have been switched by the MPTS switch 209 according to respective SIUs, into one signal, so as to transmit the multiplexed signal to a corresponding SIU. The Ethernet switch 212 switches the wavelength division demultiplexed downstream Ethernet signals from the OLT 100 to a corresponding SIU, transmits the channel selection information contained in the upstream Ethernet signal from each SIU to the MPTS switch 209, and transmits other upstream Ethernet signals to the OLT 100. Each of the transceivers 211-1 to 211-$n$ transmits the broadcasting signal and the downstream Ethernet signal switched according to each SIU, and receives an upstream Ethernet signal including the channel selection information from each SIU.

Herein, each of the transceivers 211-1 to 211-$n$ utilizes a triplex transceiver including two laser diodes (hereinafter, referred to as LDs) 301 and 302 for downstream transmission and one photo diode (hereinafter, referred to as a PD) 303 for reception. The two LDs 301 and 302 process the broadcast signal and the Ethernet signal, and the PD 303 receives the upstream Ethernet signal. In other words, the broadcast signal and the Ethernet signal are transmitted to the SIU as optical signals having different frequencies. Further, the SIU uses a triplex transceiver including two PDs 306 and 307 for receiving the broadcast signal and the Ethernet signal and one LD 308 for transmitting the upstream Ethernet signal.

Each of the SIUs 700-1 to 700-$n$ includes a transceiver 213, a time division demultiplexer (TDDM) 214, and an Ethernet switch 215. The transceiver 213 receives the broadcast signal and the Ethernet signal from the ONU 600 and transmits the upstream Ethernet signal, which has channel selection information, generated by subscriber. The TDDM 214 time division demultiplexes the broadcast signal from the ONU 600 so as to classify the demultiplexed signals into respective broadcast signals, and transmits the broadcast signals to the STB 300 of the subscriber. The Ethernet switch 215 receives the channel selection information from the STB 300 of the subscriber and the Ethernet signal from the Internet/PC 400, transmits the received channel selection information and the Ethernet signal to the ONU 600 through the transceiver 213, and transmits Ethernet information from the ONU 600, which has been sent through the transceiver 213, to the STB 300 of the subscriber or the Internet/PC 400.

Hereinafter, an operation in the FTTH will be described. First, N channels of MPTS signals, which are broadcast signals, are switched by the MPTS switch 209 according to channels required by the SIUs 700-1 to 700-$n$, and the switched signals are transmitted to the TDMs 210-1 to 210-$n$. At this time, each of the TDMs 210-1 to 210-$n$ time division multiplexes broadcast channel signals (e.g., 2 or 3 channel signals) to be transmitted to each SIU according to a specification, and the LD 301 converts the multiplexed channel signals into an optical signal.

Meanwhile, the Ethernet signal from the OLT 100 transmitted to the ONU 600 is then transmitted to the LD 302 via the Ethernet switch 212, and the LD 302 converts the Ethernet signal into an optical signal.

Further, the optical signal converted by the LD 301 and the optical signal converted by the LD 302 are combined into one signal through a wavelength division multiplexing coupler WDM 304. The combined optical signal passes an optical fiber and passes through a wavelength division multiplexing coupler WDM 305 in the SIU 700-1 to 700-n. The wavelength division multiplexing coupler WDM 305 transmits the optical signal to the PDs 306 and 307, and the PDs 306 and 307 convert the optical signals into electrical signals.

Further, the broadcast signal converted by the PD 306 is input to the TDDM 214, and the TDDM 214 time division demultiplexes the broadcast signal so as to classify the demultiplexed signal according to channels. Then, the TDDM 214 transmits the classified signals to the STB 300. Further, the Ethernet signal converted by the PD 307 is used to provide an Ethernet service such as an Internet or VOD via the Ethernet switch 215. Also, information for an interactive broadcasting service can be transmitted to the STB 300.

Herein, when the STB 300 receives a request for a digital broadcast channel change, the STB 300 transmits an Ethernet signal including a channel change protocol (hereinafter, referred to as a CCP) to the ONU 600 through the LD 308. Then, the ONU 600 performs photoelectric conversion for the Ethernet signal in the PD 303 and transmits the converted signal to the MPTS switch 209 through the Ethernet switch 212 to switch the signal to a desired channel, thereby achieving the channel change.

Figure 4:
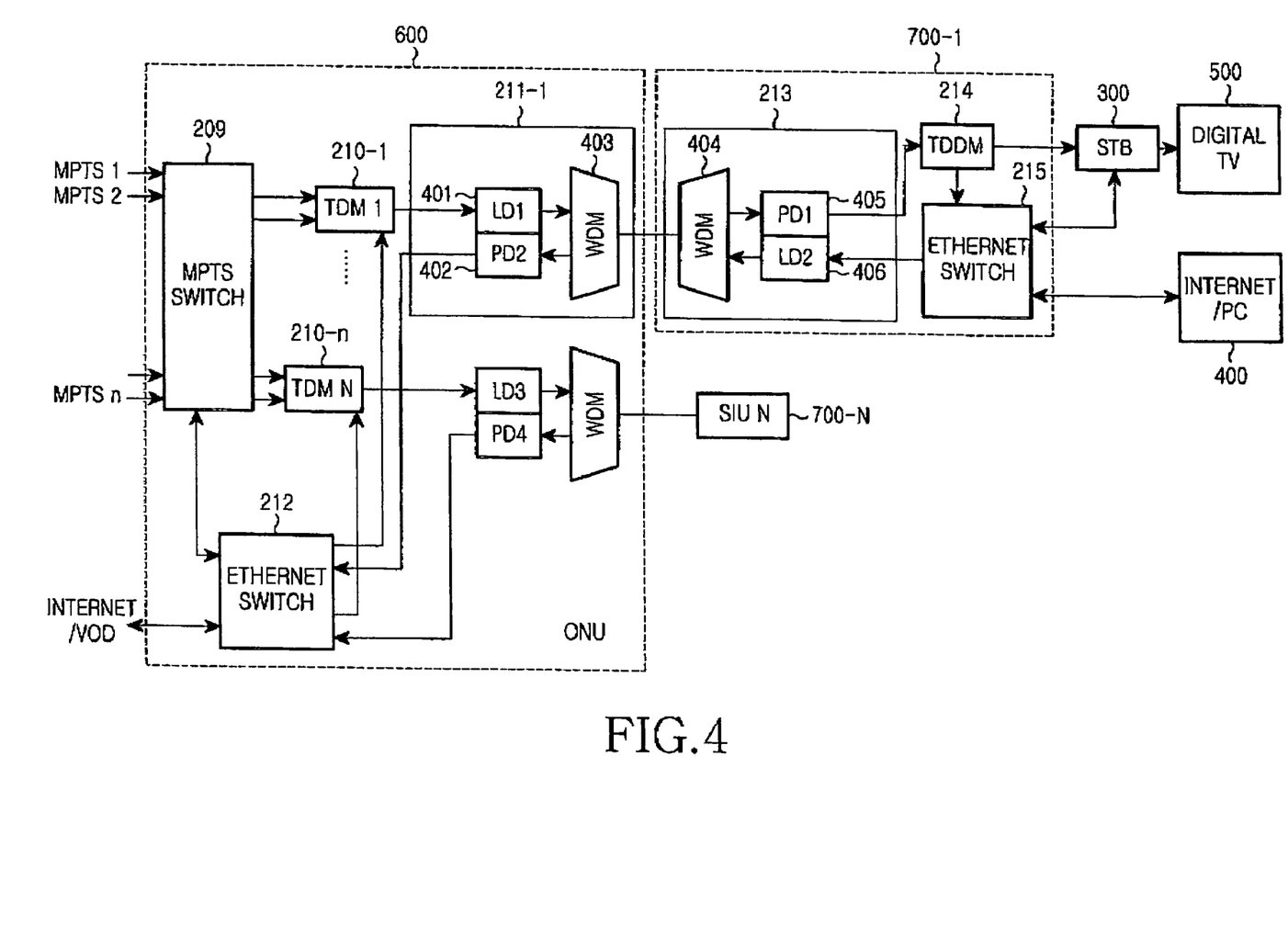
FIG. 4 is a block diagram showing another construction of an ONU and an SIU in the FTTH network for convergence of broadcasting and communication through the switched broadcasting according to the present invention.

FIG. 4 is a block diagram showing the ONU and the SIU in the FTTH network for convergence of broadcast and communication signals through the switched broadcasting according to another aspect of the present invention.

As shown in FIG. 4, a structure formed when diplex transceivers are respectively used in the ONU and the SIU in the FTTH network for the convergence of broadcast and communications through the switched broadcasting according to the present invention as illustrated in FIG. 2.

As shown in FIG. 4, the ONU 600 includes the STM demultiplexing section (not shown), the MPTS switch 209, the Ethernet switch 212, the TDMs 210-1 to 210-n, and the N number of transceivers 211-1 to 211-n. The STM demultiplexing section divides broadcast signals, which are wavelength division multiplexed by the wavelength division multiplexing demultiplexer (not shown) for wavelength division demultiplexing and dividing signals by wavelength, into a predetermined number of digital broadcast signals. The MPTS switch 209 switches the broadcast signals according to the SIU by a control signal (i.e., channel selection signal) from the Ethernet switch 212. The Ethernet switch 212 switches the wavelength division demultiplexed downstream Ethernet signals to a corresponding SIU, transmits the channel selection information contained in the upstream Ethernet signal from each SIU to the MPTS switch 209, and transmits other upstream Ethernet signals to the OLT 100. Each of the TDMs 210-1 to 210-n time division multiplexes the broadcast signal, which has been switched by the MPTS switch 209 according to each SIU, and the downstream Ethernet signal, which has been switched by the MPTS switch 209 into one signal so as to transmit the multiplexed signal to a corresponding SIU. Each of the transceivers 211-1 to 211-n transmits the broadcast signal and the downstream Ethernet signal, which have been time division multiplexed into one signal, to each SIU, and receives an Ethernet signal including the channel selection signal from each SIU.

Herein, each of the transceivers 211-1 to 211-n uses a diplex transceiver including one LD 401 for downstream transmission and one PD 402 for reception. In the present invention, in order to transmit both the broadcast signal and the Ethernet signal to the LD 401, the Ethernet signal and the broadcasting signal are time division multiplexed into one signal. An example of the multiplexed signal as described above is shown in FIG. 5, wherein 501 is MPTS #1, 502 is the MPTS #2, 503 is the MPTS #3, and 504 is the high speed Ethernet signal.

Referring back to FIG. 4, each of the SIUs 700-1 to 700-n includes a transceiver 213, a TDDM 214, and an Ethernet switch 215. The transceiver 213 receives the broadcast signal and the Ethernet signal as a single time division multiplexed signal from the ONU 600, and transmits the Ethernet signal having a channel selection signal and a communication signal generated by a subscriber to the ONU 600. The TDDM 214 time division demultiplexes the broadcast signal and the Ethernet signal from the ONU 600 so as to classify the demultiplexed signals into broadcast signals and Ethernet signals respectively. Further, the TDDM 214 transmits the broadcast signal to the STB 300 of the subscriber and transmits the Ethernet signal to the Ethernet switch 215. The Ethernet switch 215 receives the channel selection information from the STB 300 of the subscriber and the Ethernet signal for communication from the Internet/PC 400, transmits the received channel selection information and the Ethernet signal to the ONU 600 through the transceiver 213, and transmits Ethernet information from the ONU 600, which has been sent through the TDDM 214, to the STB 300 of the subscriber or the Internet/PC 400.

Hereinafter, an operation in the FTTH will be described. Firstly, N channels of MPTS signals, which are broadcast signals, are switched by the MPTS switch 209 according to channels required by the SIUs 700-1 to 700-n, and the switched signals are transmitted to the TDMs 210-1 to 210-n. Further, the Ethernet signal transmitted to the ONU 600 is transmitted to the TDMs 210-1 to 210-n via the Ethernet switch 212. At this time, each of the TDMs 210-1 to 210-n time division multiplexes a predetermined number of broadcast signals switched according to each SIU and the Ethernet signal, and the LD 401 converts the multiplexed signal into an optical signal.

The converted signal passes an optical fiber and passes through a wavelength division multiplexing coupler 404 in the SIU 700-1 to 700-n. The wavelength division multiplexing coupler WDM 404 transmits the optical signal to the PD 405, and the PD 405 converts the optical signals into an electrical signal.

Further, the signal converted by the PD 405 is inputted to the TDDM 214, and the TDDM 214 time division demultiplexes the signal. The TDDM 214 classifies the demultiplexed broadcast signal according to channels so as to transmit the classified broadcast signals to the STB 300. Also, the TDDM 214 transmits the Ethernet signal to the Ethernet switch 215. Further, the Ethernet signal is used in providing an Ethernet service such as an Internet or VOD via the Ethernet switch 215. Also, information for an interactive broadcasting service can be transmitted from the Ethernet switch 215 to the STB 300.

Herein, when the STB 300 receives a request for a digital broadcast channel change, the STB 300 transmits an Ethernet signal including a CCP to the ONU 600 through the LD 406. Further, the ONU 600 performs photoelectric conversion for the Ethernet signal in the PD 402 and transmits the converted signal to the MPTS switch 209 through the Ethernet switch 212 to switch a channel to a desired channel, thereby achieving the channel change.

Figure 5:
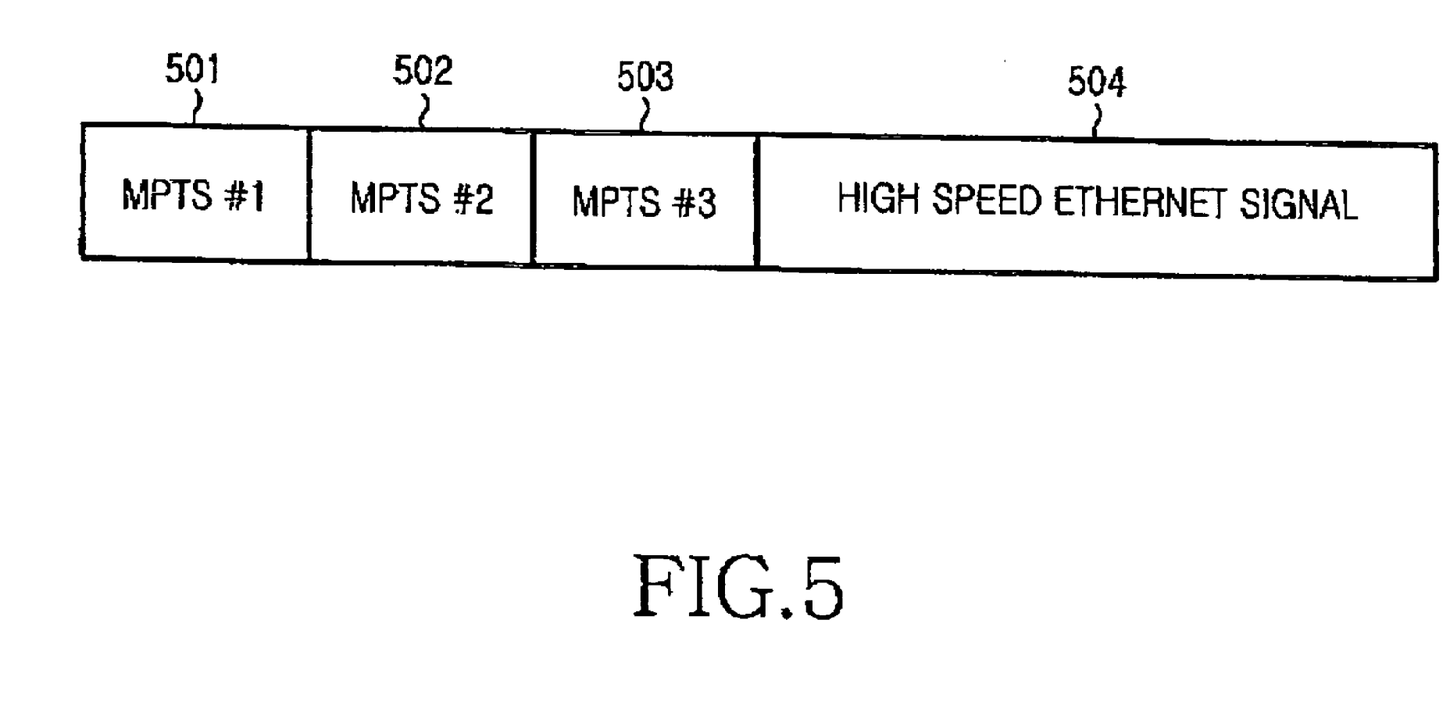
FIG. 5 is an exemplary view of a signal time division multiplexed according to the aspect of the invention illustrated in FIG. 4.

FIG. 5 provides an exemplary view of a signal time division multiplexed according to the aspect of the invention described in reference to FIG. 4.

As shown in FIG. 5, a time slot having the broadcast signal and the Ethernet signal transmitted from the ONU 600 to the SIUs 700-1 to 700-*n* includes a predetermined number of broadcast channels 501 to 503 and Ethernet information 504 set in advance.

In these aspects of the invention, since a construction of transmitting an Ethernet signal to an STB of a subscriber is for an interactive television, the construction may be omitted without affecting the scope of the present invention.

According to the present invention as described above, a service is provided to subscribers grouped in a unit of an ONU in an FTTH network for convergence of broadcast and communications signals, so that the number of subscribers is not limited by a bandwidth.

Further, according to the present invention, an ONU in an FTTH network performs switching for broadcasting so as to transmit only the broadcast information switched to each subscriber, so that a bandwidth can be more efficiently used.

Further, according to the present invention, an ONU in an FTTH network performs switching for broadcasting and transmits only broadcast information switched to each subscriber, so that the ONU can perform a subscriber authentication and a real time accounting by a CAS supporting encryption and decryption. Therefore, the present invention allows an STB of a subscriber to be liberated from constructing the complicated CAS.

Further, according to the present invention, since all channels are not transmitted to each subscriber, a low priced light source operating at a low speed can be used without using an expensive light source for increasing a transmission speed. Therefore, the construction costs for the network can be reduced.

While the invention has been shown and described with reference to certain preferred aspects thereof, it will be understood by those skilled in the art that various changes in form and details may be made therein without departing from the spirit and scope of the invention as defined by the appended claims.

What is claimed is:

1. A fiber to the home (FTTH) system for convergence of digital broadcast and communication signals through a switched broadcast, comprising:

an optical line terminal (OLT) for receiving a first predetermined number of broadcast signals and an Ethernet signal, convening the received broadcast signals and Ethernet signal into a plurality of converted optical signals, combining the converted optical signals into converged optical signals, and transmitting the converged optical signals by an optical wavelength division multiplexing method;

an optical network unit (ONU) for receiving and classifying the converged optical signals transmitted from the OLT back into the first predetermined number of broadcast signals and the Ethernet signal, converting the classified signals into electrical signals, and said ONU switching a second predetermined number of broadcast signals from the first predetermined number of broadcast signals according to each subscriber interface unit (SIU) by a channel selection information contained in upstream Ethernet information, switching the Ethernet signal to be transmitted according to each SIU and transmitting the switched second predetermined number of the switched broadcast signals and the switched Ethernet signals in optical; and an SIU for converting the second predetermined number of broadcast signals transmitted from the ONU into electrical signals, transmitting the second predetermined number of broadcast signals and the Ethernet signal to be transmitted to a subscriber to a corresponding subscriber' terminal, and transmitting the upstream Ethernet information including the upstream Ethernet information for the broadcasting signal to the ONU;

wherein only the second predetermined number of broadcast signals selected through switching using the channel selection information is transmitted to the SIU from the ONU.

2. A fiber to the home (FTTH) system for convergence of digital broadcast and communication signals through a switched broadcast, comprising:

an optical line terminal (OLT) for receiving a first predetermined number of broadcast signals and an Ethernet signal, converting the received broadcast signals and Ethernet signal into a plurality of converted optical signals, combining the converted optical signals into converged optical signals, and transmitting the converged optical signals by an optical wavelength division multiplexing method;

an optical network unit (ONU) for receiving and classifying the converged optical signals transmitted from the OLT back into the first predetermined number of broadcast signals and the Ethernet signal, converting the classified signals into electrical signals, and said ONU switching a second predetermined number of broadcast signals from the first predetermined number of broadcast signals according to each subscriber interface unit (SIU) by a channel selection information contained in upstream Ethernet information, switching the Ethernet signal to be transmitted according to each SIU and transmitting the switched second predetermined number of the switched broadcast signals and the switched Ethernet signals in optical; and an SIU for converting the second predetermined number of broadcast signals transmitted from the ONU into electrical signals, transmitting the second predetermined number of broadcast signals and the Ethernet signal to be transmitted to a subscriber to a corresponding subscriber' terminal, and transmitting the upstream Ethernet information including the upstream Ethernet information for the broadcasting signal to the ONU, wherein the ONU comprises:

a multiple program transport stream (MPTS) switch for switching the second predetermined number of broadcast signals of the first predetermined number of broadcasting signals according to each SIU by the channel selection information contained in the upstream Ethernet information transmitted from the SIUs;

a plurality of time division multiplexers for time division multiplexing the second predetermined number of SIU-based broadcast signals so as to transmit the multiplexed signal to a corresponding SIU;

a first Ethernet switch for switching the Ethernet signal from the OLT from the switched signals to the SIU, and for transmitting the channel selection information contained in upstream Ethernet information from the SIU to the MPTS switch; and a first transceiver for transmitting the time division multiplexed broadcast signal and the Ethernet signal from the OLT switched by the first Ethernet switch to each SIU, and receiving the upstream Ethernet information from the SIUs to transmit the received information to the first Ethernet switch.

3. The FTTH system as claimed in claim 2, wherein the SIU comprises:
   a second transceiver for receiving the time division multiplexed broadcast signal and the Ethernet signal transmitted to the OLT from the ONU, and transmitting the upstream Ethernet information having the channel selection information generated by the subscriber;
   a time division demultiplexer for time division demultiplexing the time division multiplexed broadcasting signal from the ONU so as to classify the broadcast signal into respective broadcasting signals, and transmitting the classified signals to a set top box (STB) of a subscriber in an exterior; and
   a second Ethernet switch for receiving channel selection information from the STB of the subscriber and an Ethernet signal from an exterior internet/PC so as to the received information and signal to the transceiver, transmitting the Ethernet signal from the OLT transmitted through the transceiver to an exterior apparatus.

4. The FTTH system as claimed in claim 3, wherein the second transceiver comprises a triplex transceiver including:
   a second optical receiver for converting the time division multiplexed broadcast signal from the ONU into an electrical signal so as to transmit the converted signal to the time division demultiplexer;
   a third optical receiver for convening the Ethernet signal from the OLT into an electrical signal so as to transmit the converted signal to the second Ethernet switch; and
   a third optical transmitter for receiving the upstream Ethernet information from the second Ethernet switch so as to transmit the received information to the ONU.

5. The FTTH system as claimed in claim 2, wherein the first transceiver is a triplex transceiver comprising:
   a first optical transmitter for converting each of the time division multiplexed broadcasting signals into an optical signal to provide a plurality of converted optical signals that are transmitted;
   a second optical transmitter for converting the Ethernet signal from the OLT into an optical signal so as to transmit the convened signal along with the plurality of converted optical signals as converged optical signals; and
   a first optical receiver for receiving the upstream Ethernet information from at least one SIU so as to transmit the received information to the first Ethernet switch.

6. A fiber to the home (FTTH) system for convergence of digital broadcast and communication signals through a switched broadcast, comprising:
   an optical line terminal (OLT) for receiving a first predetermined number of broadcast signals and an Ethernet signal, converting the received broadcast signals and Ethernet signal into a plurality of converted optical signals, combining the converted optical signals into converged optical signals, and transmitting the converged optical signals by an optical wavelength division multiplexing method:
   an optical network unit (ONU) for receiving and classifying the converged optical signals transmitted from the OLT back into the first predetermined number of broadcast signals and the Ethernet signal, converting the classified signals into electrical signals, and said ONU switching a second predetermined number of broadcast signals from the first predetermined number of broadcast signals according to each subscriber interface unit (SIU) by a channel selection information contained in upstream Ethernet information, switching the Ethernet signal to be transmitted according to each SIU and transmitting the switched second predetermined number of the switched broadcast signals and the switched Ethernet signals in optical; and
   an SIU for converting the second predetermined number of broadcast signals transmitted from the ONU into electrical signals, transmitting the second predetermined number of broadcast signals and the Ethernet signal to be transmitted to a subscriber to a corresponding subscriber' terminal, and transmitting the upstream Ethernet information including the upstream Ethernet information for the broadcasting signal to the ONU, wherein the ONU comprises:
   an MPTS switch for switching the second predetermined number of broadcasting signals of the first predetermined number of broadcasting signals according to each SIU by channel selection information, contained in the upstream Ethernet information transmitted from the SIUs;
   a first Ethernet switch for switching the Ethernet signal from the OLT so as to transmit the switched signal to the SIU, and transmitting the channel selection information contained in the upstream Ethernet information from the SIU to the MPTS switch;
   a plurality of time division multiplexers for time division multiplexing the second predetermined number of SIU-based broadcasting signals switched by the MPTS switch and the Ethernet signal from the OLT transmitted through the first Ethernet switch to transmit the broadcast signals and the Ethernet signal to a corresponding subscriber; and
   a first transceiver for transmitting the time division multiplexed broadcasting signal and the Ethernet signal to each SIU, and receiving the upstream Ethernet information from the SIUs to transmit the received information to the first Ethernet switch.

7. The FTTH system as claimed in claim 6, wherein the SIU comprises:
   a second transceiver for receiving the time division multiplexed broadcasting signal and the Ethernet signal from the ONU, and transmitting the upstream Ethernet information having the channel selection information generated by the subscriber;
   a time division demultiplexer for time division demultiplexing the time division multiplexed broadcasting signal and the Ethernet signal from the ONUs to classify the signals into respective broadcastings signal and Ethernet signals, and transmitting the classified broadcasting signal to an STB of a subscriber in an exterior; and
   a second Ethernet switch for receiving channel selection information from the STB of the subscriber and an upstream Ethernet signal from an exterior internet/PC so as to the received information and signal to the second transceiver, transmitting the Ethernet signal transmitted through the time division demultiplexer to an exterior apparatus.

8. The FTTH system as claimed in claim 7, wherein the second transceiver includes a diplex transceiver comprising:
   a second optical transmitter for converting the time division multiplexed broadcasting signal and the Ethernet signal from the ONU into an electrical signal so as to transmit the converted signal to the time division demultiplexer; and a second optical receiver for receiving the upstream Ethernet information from the second Ethernet switch so as to transmit the received information to the ONU.

9. The FTTH system as claimed in claim 6, wherein the first transceiver comprises a diplex transceiver including:
   a first optical transmitter for converting the time division multiplexed broadcast signal and the Ethernet signal from the OLT into a plurality of converted optical signals so as to transmit the converted signals; and
   a first optical receiver for receiving the upstream Ethernet information from the SIUs so as to transmit the received information to the first Ethernet switch.

10. A method providing convergence of digital broadcast and communication signals through a switched broadcast in a fiber to the home (FTTH) system, said method comprising the steps of:
   (a) receiving a first predetermined number of broadcast signals and an Ethernet signal by an optical line terminal (OLT) for, converting the received broadcast signals and Ethernet signal into a plurality of converted optical signals, combining the converted optical signals into converged optical signals, and transmitting the converged optical signals by an optical wavelength division multiplexing method;
   (b) receiving and classifying the converged optical signals transmitted from the OLT by an optical network unit (ONU) for the first predetermined number of broadcast signals and the Ethernet signal by converting the classified signals into electrical signals, and said ONU switching a second predetermined number of broadcast signals from the first predetermined number of broadcast signals according to each subscriber interface unit (SIU) by a channel selection information contained in upstream Ethernet information, and switching the Ethernet signal to be transmitted according to each SIU so as to transmit the switched signals; and
   (c) converting the second predetermined number of broadcast signals transmitted from die ONU into electrical signals by the SIU, transmitting the second predetermined number of broadcast signals and the Ethernet signal to be transmitted to a subscriber to a corresponding subscriber's terminal, and transmitting the upstream Ethernet information including the upstream Ethernet information for the broadcasting signal to the ONU, wherein only the second predetermined number of broadcast signals selected through using the channel selection information is transmitted to the SIU from the ONU.

11. A method providing convergence of digital broadcast and communication signals through a switched broadcast in a fiber to the home (FTTH) system, said method comprising the steps of:
   (a) receiving a first predetermined number of broadcast signals and an Ethernet signal by an optical line terminal (OLT) for, converting the received broadcast signals and Ethernet signal into a plurality of converted optical signals, combining the converted optical signals into converged optical signals, and transmitting the converged optical signals by an optical wavelength division multiplexing method;
   (b) receiving and classifying the converged optical signals transmitted from the OLT by an optical network unit (ONU) for the first predetermined number of broadcast signals and the Ethernet signal by converting the classified signals into electrical signals, and said ONU switching a second predetermined number of broadcast signals from the first predetermined number of broadcast signals according to each subscriber interface unit (SIU) by a channel selection information contained in upstream Ethernet information, and switching the Ethernet signal to be transmitted according to each SIU so as to transmit the switched signals; and
   (C) converting the second predetermined number of broadcast signals transmitted from the ONU into electrical signals by the SIU, transmitting the second predetermined number of broadcast signals and the Ethernet signal to be transmitted to a subscriber to a corresponding subscriber's terminal, and transmitting the upstream Ethernet information including the upstream Ethernet information for the broadcasting signal to the ONU, wherein the ONU comprises:
   a multiple program transport stream (MPTS) switch for switching the second predetermined number of broadcast signals of the first predetermined number of broadcasting signals according to each SIU by the channel selection information contained in the upstream Ethernet information transmitted from the SIUs;
   a plurality of time division multiplexers for time division multiplexing the second predetermined number of SIU-based broadcast signals so as to transmit the multiplexed signal to a corresponding SIU;
   a first Ethernet switch for switching the Ethernet signal from the OLT from the switched signals to the SIU, and for transmitting the channel selection information contained in upstream Ethernet information from the SIU to the MPTS switch; and
   a first transceiver for transmitting the time division multiplexed broadcast signal and the Ethernet signal from the OLT switched by the first Ethernet switch to each SIU, and receiving the upstream Ethernet information from the SIUs to transmit the received information to the first Ethernet switch.

12. The method according to claim 11, wherein the SIU comprises:
   a second transceiver for receiving the time division multiplexed broadcast signal and the Ethernet signal transmitted to the OLT from the ONU, and transmitting the upstream Ethernet information having the channel selection information generated by the subscriber;
   a time division demultiplexer for time division demultiplexing the time division multiplexed broadcasting signal from the ONU so as to classify the broadcast signal into respective broadcasting signals, and transmitting the classified signals to a set top box (STB) of a subscriber in an exterior; and
   a second Ethernet switch for receiving channel selection information from the STB of the subscriber and an Ethernet signal from an exterior internet/PC so as to the received information and signal to the transceiver, transmitting the Ethernet signal from the OLT transmitted through the transceiver to an exterior apparatus.

13. The method according to claim 12, wherein the second transceiver comprises a triplex receiver including:
   a second optical receiver for converting the time division multiplexed broadcast signal from the ONU into an electrical signal so as to transmit the converted signal to the time division demultiplexer;
   a third optical receiver for converting the Ethernet signal from the OLT into an electrical signal so as to transmit the converted signal to the second Ethernet switch; and
   a third optical transmitter for receiving the upstream Ethernet information from the second Ethernet switch so as to transmit the received information to the ONU.

14. The method according to 11, wherein the first transceiver comprises a triplex transceiver including:
- a first optical transmitter for converting each of the time division multiplexed broadcasting signals into an optical signal to provide a plurality of converted optical signals that are transmitted;
- a second optical transmitter for converting the Ethernet signal from the OLT into an optical signal so as to transmit the converted signal along with the plurality of converted optical signals as converged optical signals; and
- a first optical receiver for receiving the upstream Ethernet information from at least one SIU so as to transmit the received information to the first Ethernet switch.

15. A method providing convergence of digital broadcast and communication signals through a switched broadcast in a fiber to the home (FTTH) system, said method comprising the steps of:
 (a) receiving a first predetermined number of broadcast signals and an Ethernet signal by an optical line terminal (OLT) for, converting the received broadcast signals and Ethernet signal into a plurality of converted optical signals, combining the converted optical signals into converged optical signals, and transmitting the converted optical signals by an optical wavelength division multiplexing method:
 (b) receiving and classifying the converged optical signals transmitted from the OLT by an optical network unit (ONU) for the first predetermined number of broadcast signals and the Ethernet signal by converting the classified signals into electrical signals, and said ONU switching a second predetermined number of broadcast signals from the first predetermined number of broadcast signals according to each subscriber interface unit (SIU) by a channel selection information contained in upstream Ethernet information, and switching the Ethernet signal to be transmitted according to each SIU so as to transmit the switched signals; and
 (c) converting the second predetermined number of broadcast signals transmitted from the ONU into electrical signals by the SIU, transmitting the second predetermined number of broadcast signals and the Ethernet signal to be transmitted to a subscriber to a corresponding subscriber's terminal, and transmitting the upstream Ethernet information including the upstream Ethernet information for the broadcasting signal to the ONU, wherein the ONU comprises:
 an MPTS switch for switching the second predetermined number of broadcasting signals of the first predetermined number of broadcasting signals according to each SIU by channel selection information contained in the upstream Ethernet information transmitted from the SIUs;
 a first Ethernet switch for switching the Ethernet signal from the OLT so as to transmit the switched signal to the SIU, and transmitting the channel selection information contained in the upstream Ethernet information from the SIU to the MPTS switch;
 a plurality of time division multiplexers for time division multiplexing the second predetermined number of SIU-based broadcasting signals switched by the MPTS switch and the Ethernet signal from the OLT transmitted through the first Ethernet switch to transmit the broadcast signals and the Ethernet signal to a corresponding subscriber; and
 a first transceiver for transmitting the time division multiplexed broadcasting signal and the Ethernet signal to each SIU, and receiving the upstream Ethernet information from the SIUs to transmit the received information to the first Ethernet switch.

16. The method according to claimed in claim 15, wherein the SIU comprises:
- a second transceiver for receiving the time division multiplexed broadcasting signal and the Ethernet signal from the ONU, and transmitting the upstream Ethernet information having the channel selection information generated by the subscriber;
- a time division demultiplexer for time division demultiplexing the time division multiplexed broadcasting signal and the Ethernet signal from the ONUs to classify the signals into respective broadcastings signal and Ethernet signals, and transmitting the classified broadcasting signal to an STB of a subscriber in an exterior; and
- a second Ethernet switch for receiving channel selection information from the STB of the subscriber and an upstream Ethernet signal from an exterior internet/PC so as to the received information and signal to the second transceiver, transmitting the Ethernet signal transmitted through the time division demultiplexer to an exterior apparatus.

17. The method according to claim 16, wherein the second transceiver includes a diplex transceiver comprising:
- a second optical transmitter for converting the time division multiplexed broadcasting signal and the Ethernet signal from the ONU into an electrical signal so as to transmit the converted signal to the time division demultiplexer; and
- a second optical receiver for receiving the upstream Ethernet information from the second Ethernet switch so as to transmit the received information to the ONU.

18. The method according to claim 15, wherein the first transceiver comprises a diplex transceiver including:
- a first optical transmitter for converting the time division, multiplexed broadcast signal and the Ethernet signal from the OLT into a plurality of converted optical signals so as to transmit the converted signals; and
- a first optical receiver for receiving the upstream Ethernet information from the SIUs so as to transmit the received information to the first Ethernet switch.

* * * * *